Nov. 30, 1965  T. R. OAKLEY  3,220,503
SEISMIC SHOOTING SEQUENCE TIMER
Filed Aug. 29, 1961  3 Sheets-Sheet 1

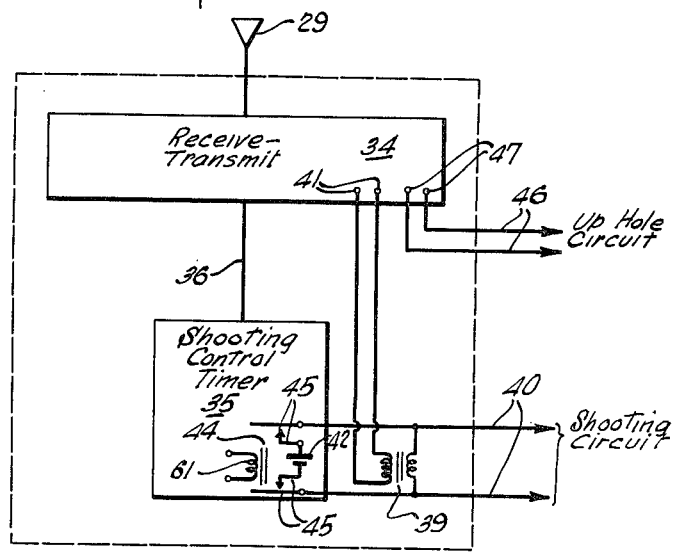
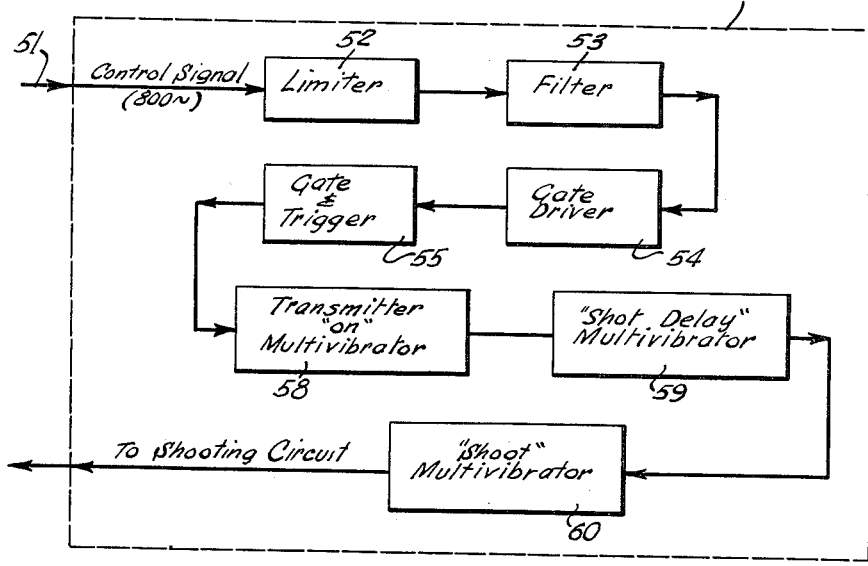

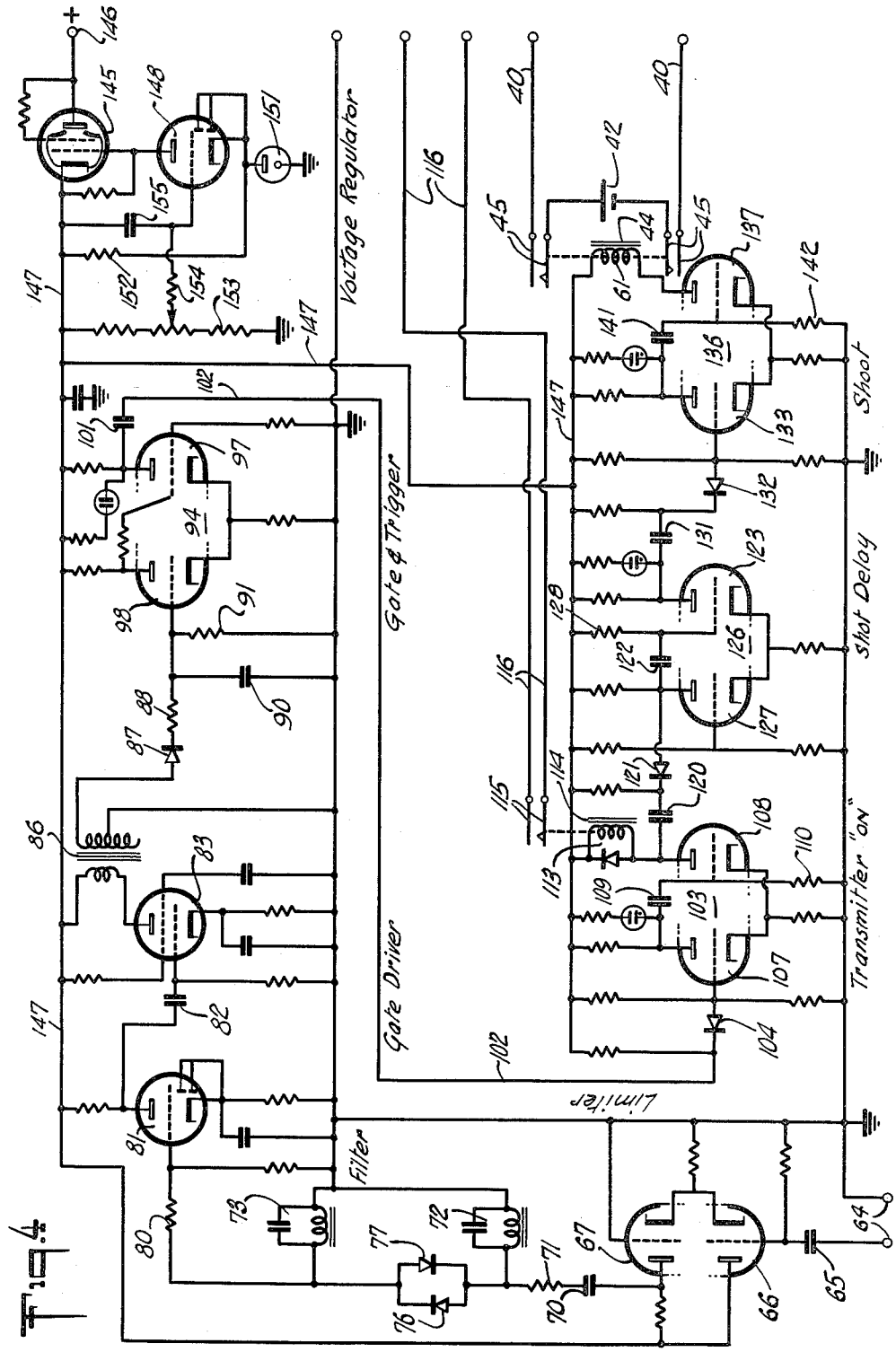

Patented Nov. 30, 1965

3,220,503
SEISMIC SHOOTING SEQUENCE TIMER
Tilton R. Oakley, Bellaire, Tex., assignor to Texaco Inc., New York, N.Y., a corporation of Delaware
Filed Aug. 29, 1961, Ser. No. 134,775
6 Claims. (Cl. 181—.5)

This invention is concerned with seismic exploration generally, and more specifically deals with seismic exploration wherein a radio communication link is maintained between the recording station and the shooting station for the purposes of the operation.

In modern seismic exploration operations, particularly where magnetic tape recording is employed, it is important to provide for timing of the shot, i.e. detonation of an explosive charge, in an exact manner in relation to the recording operation. In such operations, there is no particular problem with such exact timing in cases where the shot point or shooting station is located close enough to the recording station to make a direct wire connection feasible. However, in cases where the shot point is located farther away so that a radio communication contact is the only feasible manner of communicating between the shot point and the recording station, the problem of maintaining accurate timing control of the charge detonation raises the difficulties involved in providing such control while maintaining safety and avoiding undesired misfiring of the charge.

Consequently this invention is applicable to a seismic exploration operation where exact timing and control of the charge detonation is to be had by means of a radio link from the recording station to the shooting station.

Another object of this invention is to provide a radio controlled shot timer that provides for exact timing of the charge detonation under control of a radio transmitted signal, while eliminating the possibility of spurious or undesired signals causing the charge to be fired.

Briefly, the invention applies to seismic exploration where there is employed a radio link controlled shooting sequence timer. Such timer comprises electronic circuit means for receiving a control signal having predetermined characteristics. It also comprises means for selectively passing said control signal only, and in addition means for setting an electronic trigger upon passage of said control signal. The said trigger is tripped upon termination of the control signal. Also, the system comprises means controlled by the said trigger when tripped for initiating at least one time delay period.

Again briefly, the invention is concerned with a radio communication system for use in seismic exploration operations wherein radio communication is maintained between a recording station and a shooting station. The said shooting station has a charge firing circuit and a seismic detector uphole circuit. The invention is concerned with the combination that comprises a source of constant frequency control signal at said recording station having a predetermined time duration, and a shooting control timer at said shooting station for actuating said shooting circuit and connecting said uphole circuit to the transmitter at said shooting station. In this combination, the said shooting control timer comprises a gate for passing said control signal after a predetermined time portion thereof, and a trigger circuit connected to said gate to be set by said control signal and for producing a trigger signal at the termination of said control signal. The timer also comprises a first multivibrator connected to receive said trigger signal and having a predetermined time delay period. Such first multivibrator has an output circuit for switching the radio at said shooting station from receive to transmit, and has another output circuit for producing a second trigger signal. The timer also comprises a second multivibrator connected to receive said second trigger signal. This second multivibrator has a predetermined time delay period that is less than the delay period for the first multivibrator. The second multivibrator has an output circuit for providing a third trigger signal at the end of the second time delay period. Finally, the timer also comprises means for closing the said shooting circuit to fire said charge upon receipt of said third trigger signal.

The foregoing and other objects and benefits of the invention are set forth below in greater detail in connection with a specific embodiment of the invention that is illustrated in the drawings, in which:

FIGURE 2 is a schematic block diagram illustrating relevant parts of the electronic equipment located at the shooting station, which includes a shooting control timer according to the invention;

FIGURE 3 is a schematic block diagram illustrating the details of a shooting control timer according to the invention; and, FIGURE 4 is a circuit diagram illustrating in greater detail the elements involved in the shooting control timer of this invention.

Figure 1:
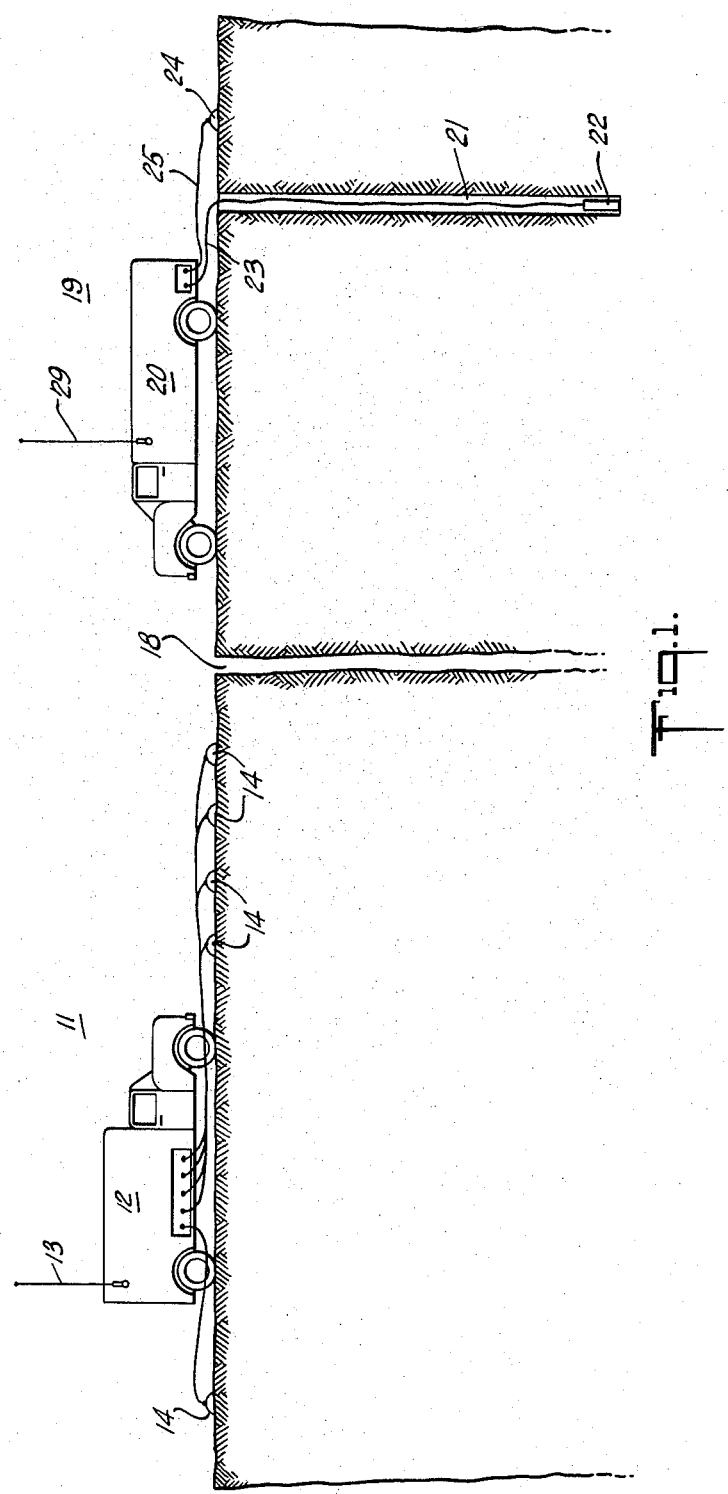
FIGURE 1 is a schematic diagram showing the surface of the earth in cross section with a recording station and separated therefrom a shooting station that is to be controlled from the recording station.

Referring to FIGURE 1, it is pointed out that a seismic exploration operation which embodies the use of this invention is one where the distance between the recording station and the shooting station is too great for a direct wire circuit connection therebetween. Thus in FIGURE 1 there is illustrated a recording station 11 where the usual equipment is located including a recording truck 12. Truck 12 has in addition to its other equipment, radio communication equipment included therein, as indicated by the showing of an antenna 13 on the truck. In addition there is the usual plurality of seismic detectors 14 that are electrically connected to the recording equipment in the truck 12 in the usual manner.

Spaced from the recording station 11, as indicated by a break 18 in the cross section showing of the earth, there is a shooting station 19. At the shooting station there is located a shooting truck 20 which has the usual equipment thereon, including a supply of explosive charges (not shown) for loading a shot hole 21. The shot hole 21 is shown loaded with an explosive charge 22 that is connected to the truck 20 by an electrical circuit connector 23 in order to provide for electrically detonating the charge 22 at the desired time. The connector 23 is, of course, actually a pair of conductors that connect the terminals of an electrical detonating cap (not shown) which is embedded in the charge 22, with a battery or similar source of electric power via a charge firing switch as will appear more fully below.

In addition, there is employed a so-called uphole seismic detector 24 that is placed on the surface adjacent to the top of the borehole 21. This detector 24 is, of course, connected electrically, as by means of a circuit connector 25 illustrated, to the truck 20 for relaying the signal generated by detector 24 from the shooting station 19 to the recording station 11. As was the case with the shooting connector 23, the connector 25 is actually a pair of conductors. In this case these conductors are for carrying the two sides of the detector circuit from detector 24 to the radio equipment in the truck 20.

As will appear in greater detail below the uphole information is relayed via a radio communication link that is maintained between the shooting truck 20 and the recording truck 12. Thus, as was the case in the recording station the shooting truck 20 carries radio equipment, as indicated by the illustration of an antenna 29 on the shooting truck 20.

It will be appreciated by anyone skilled in the art of seismic exploration, that a record is made at the recording station 11 which records the receipt of seismic energy as it arrives and is picked up by the detectors 14 after having traveled through the earth from the explosive charge 22 at the time of its detonation. As such a record is taken, the exact time of the charge detonation must be recorded with the information received by the detectors 14. In addition, it is valuable to have also recorded with the data from detectors 14, the information available by reason of the first arriving energy at the surface near the top of the borehole 21, i.e. the uphole signal. This data is picked up by the detector 24 and is transmitted similarly as is the instant of charge detonation, i.e. from the shooting truck 20 to the recording truck 12 so that the record made includes all of this information.

As indicated above, in modern seismic exploration procedures it is important to be able to control the instant of detonation of the charge, e.g. charge 22, from the recording station so that the exact time of detonation is carefully controlled in relation to a recording medium, such as magnetic tape. One reason for this is that it is often valuable to be able to composite information from one record with subsequent information from another record taken later.

In order to help understand how the control signal for providing exact time detonation of the charge 22 at the shooting station 19 is initiated by a signal transmitted from the recording station 11, a general review of the whole radio communication arrangement in seismic shooting operations will be helpful. Thus, under any seismic exploration operation where communication from the shooting station to the recording station is by a radio link, the procedure involves establishing a radio communication contact and then upon direction from the recording station detonating the charge while the shooting station radio is in transmit condition. At the same time the recording station radio will be tuned in to receive the radio signals transmitted from the shooting station so that a "time break" will be transmitted at the instant of the detonation of the explosive charge. This is carried out via the transmitter at the shooting station to the receiver at the recording station where this "time break" signal may be recorded on the record then being made. However, the operation just described is ordinarily carried out by having the person in charge of the shooting station operating its radio and manually causing the charge to be detonated at a time when the recorder is prepared for the charge to be fired. Obviously under such procedure no exact timing of the detonation of the charge with relation to the record as being made at the recording station is possible since the recorder is manually starting the recording equipment while the shooter is manually firing the charge. In order to carry out exact controlled timing of the charge detonation relative to a record, the control signal for initiating the actual detonation of the charge must emanate from the recording station. Under prior operations this has been done by maintaining a wire circuit connection from the recording station to the shooting station so as to exercise this exact timing control. Where the distance involved is such as to make it impractical for a direct wire connection this control operation of the exact detonation as initiated from the recording station must be carried out via a radio link, but under such circumstances there is always the problem of providing control such that it will not be affected by adverse conditions such as static, or general noise transmissions in the nature of interference, or the like. It is this very problem that is overcome by means of a shooting control timer that is located at the shooting station and is subject to control emanating from the recording station.

Involved in the foregoing arrangement is the use of a control signal, generated at the recording truck 12, that is an 800 cycle A.C. signal which is taken from the timing fork that is employed with the magnetic tape drum drive equipment. The control signal employed is therefore an 800 cycle tone that is created by making use of a so-called shutter microswitch that is located on the magnetic tape drum at the recording station. This microswitch and the circuits at the recording station are arranged to control connection of the timing fork for modulating the transmitter ratio frequency signal at about 100% modulation during the time the oscillograph shutter is closed. Consequently, the whole arrangement is such that the recording station radio is switched to transmit automatically at the beginning of the recording operation, to coincide with the closing of the shutter on the oscillograph. Then it is switched back to receive with the opening of the shutter. This oscillograph shutter is closed for approximately three-quarters of a second at the beginning of a recording operation. In this manner a three-quarter of a second 800 cycle tone is provided that is transmitted in the usual manner as a modulation signal on the radio frequency energy which transmits the signal from the recording truck 12 to the shooting truck 20. Thereafter, as indicated, the recording truck radio will be returned to its receive condition in order to receive and record the time break and the uphole signals from the shooting station. Consequently when the charge has been loaded and the shooting station is in readiness following initial radio contact, the shooting truck 20 will have its radio equipment in the receive condition and it will be the receipt of the indicated 800 cycle control signal that will initiate the charge firing timing sequence. Furthermore, as will appear below in more detail following the completion of a cycle (wherein the charge is fired and the uphole detector data is transmitted back to the recording station) the radio in the shooting truck 20 will be returned once more to receive position for maintaining contact and receiving any verbal instructions from the recording station.

Referring to FIGURES 2 and 3 and having in mind the general nature of the operations described above in connection with FIGURE 1, it is pointed out that at the shooting station 19, i.e. in the shooting truck 20, there is located a radio 34 (FIGURE 2) that is a standard piece of equipment for seismic operations and includes the usual controls (not shown) for switching from transmit to receive as desired. This radio 34 is, of course, connected to the antenna 29 and in addition there is connected with the radio 34 a shooting control timer 35 schematically illustrated in FIGURE 2, and shown in greater detail in FIGURE 4. It is pointed out that there is a single line connection 36 illustrated between the radio 34 and the timer 35. This single line is merely provided to schematically indicate the required connections involved between the radio 34 and the timer 35. Additionally it is to be noted that in FIGURE 2 there is shown a pair of circuit connectors 40 which have the caption "shooting circuit" applied thereto and that are for connection to the cap wires involved in the charge circuit connector 23 that is shown in FIGURE 1. It will be observed that coupled with the connectors 40 by means of a transformer 39 shown, there is a branch circuit leading to the radio 34 via a pair of terminals 41 illustrated. It will be clear to anyone skilled in this art that the arrangement provides for connection into a modulation circuit (not shown) of the ratio 34 via terminals 41 so that the time break signal will be transmitted from the radio 34 when in its transmit state. Closing of this shooting circuit for applying a voltage, e.g. a source 42 shown that will detonate the charge 22, is carried out by a relay 44 having switch contacts 45 associated therewith. The control of the relay 44 is carried out by the timer 35 in a manner which will be described hereafter.

It is also pointed out that the radio 34 in the shooting truck 20 includes a pair of connectors 46 associated there- 103. It will be understood that the multivibrator 103 is one which may be employed as the multivibrator 58 of FIGURE 3. It will be observed that there is a rectifier 104 employed so that the setting operation of the Schmidt trigger will not cause a signal to be applied to the first multivibrator 103.

The multivibrator 103 has two triode tubes 107 and 108 that are connected in a standard manner to act as a monostable multivibrator, with the stable state such that tube 107 is conducting while tube 108 is cut off. The controlling time constant elements, i.e. a capacitor 109 and a resistor 110 of the multivibrator 103, are provided with values such that the time constant of the multivibrator operation is a full second of time. In other words, the multivibrator 103 is designed for a 1000 millisecond operation between a tripping signal and its return to the stable state thereafter.

It is to be observed that in the plate circuit of the triode 108 there is a relay 114 that has a pair of switch contacts 115 actuated by current flow in a solenoid 113. The contacts 115 act to control switching of the radio 34 at the shooting station 19 (as previously indicated) via a pair of circuit connection wires 116. The arrangement is such that when contacts 115 are open the radio 34 is in its receive mode, while when the contacts 115 are closed the radio is switched over to the transmit mode. Thus, in accordance with the foregoing, when multivibrator 103 is tripped the tube 108 goes conducting while 107 is cut off. Consequently current flows through the coil 113 of relay 114 and actuates the switch contacts 115 to the closed position. Therefore, these contacts stay closed for the full one second time constant period of the multivibrator 103.

Simultaneously with the tripping of multivibrator 103 (and actuation of the switch contacts 115) a second trigger signal is created and is passed on via a capacitor 120 and a rectifier 121 as well as another capacitor 122, to the grid circuit of a triode tube 123. Tube 123 is the normally conducting tube of a second multivibrator 126 (multivibrator 59 of FIGURE 3) which also includes another triode tube 127. The second trigger signal thus acts to cut off the tube 123 and flip over the multivibrator 126 so that the other tube 127 is then conducting while tube 123 remains cut off. The time constant for operation of the multivibrator 126 is determined by the values for the capacitor 122 and a resistor 128. These values are set to provide for a 100 millisecond time delay (after which multivibrator 126 returns to its stable condition with the tube 123 conducting and the tube 127 cut off). In this manner the shot delay time is determined by the action of multivibrator 126 and is set to be long enough for allowing decay of any switching transients and the like before the shot is fired.

After the end of the time delay determined by multivibrator 126, a third trigger signal is created and is passed on from the plate circuit of tube 123 via a capacitor 131 and another rectifier 132 to the grid circuit of a triode tube 133. This third trigger signal acts to cut off the tube 133 (which is normally conducting during the stable state of a third multivibrator 136). The multivibrator 136 has another triode tube 137 as part thereof, which tube has in the plate circuit the relay 44 that controls the pair of contacts 45. These contacts 45 are in the shooting circuit which includes the conductors 40 as was explained above in connection with FIGURE 2. The time constant for the operation of multivibrator 136 is set for a relatively short time, e.g. 50 milliseconds as already indicated, which is adequate for closing the shooting circuit and holding it closed long enough to insure firing of the cap and the transmission of the time break signal. This time break signal is, of course, the signal created upon the closing followed by opening of the circuit which connected a potential source to the firing element of a blasting cap. The determination of the time constant for multivibrator 136 is principally determined by the values of a capacitor 141 and an associated resistor 142.

In connection with the operation of the shooting control timer just described above, it may be noted that it is advisable to provide a voltage regulator arrangement in order to insure that the plate supply voltage throughout the timer circuits will remain substantially constant. Such a voltage regulator is illustrated at the upper right hand corner of the FIGURE 4 circuit diagram. There is employed a beam pentode vacuum tube 145 which is connected in series between the positive high potential supply introduced at a terminal 146, and a plate supply line 147 that is carried throughout the timer circuits. There is a tube 148 connected as illustrated with its plate directly connected to the control grid of tube 145, while the cathode thereof is connected to the plate of a voltage reference tube 151 and to one end of a resistor 152, the other end of which resistor is connected to the high potential supply line 147. The other electrode of the voltage reference tube 151 is connected to ground as shown. The grid of the tube 148 is connected to a potentiometer 153 via a resistor 154, and there is a capacitor 155 connected between the grid of tube 148 and the regulated voltage supply line 147. The operation of this voltage regulator arrangement is standard and well known and no further description thereof need be given here.

OPERATION—FIGURE 4

A brief review of the operation involved in a cycle of the shooting control timer with respect to the FIGURE 4 circuit is as follows. The control signal, i.e. an 800 cycle tone having a duration of about three-quarters of a second, is applied via the receiver of radio 34 (FIG. 2) to the input terminals 64 and then passes along through the limiter that includes triodes 66 and 67 where the amplitude is limited in order to minimize the variations in amplitude of the control signal. The reason for doing so is to keep the charging time of the capacitor 90 substantially constant even if the amplitude of the 800 cycle tone at terminals 64 should vary. The signal then passes through the filter which includes reactors 72 and 73 as well as the rectifier pair 76 and 77, and acts as a narrow band pass filter to reject all frequencies except 800 cycles. At the output end of the filter the signal is fed into tube 81 which is merely an amplifier and then it passes on into tube 83 which acts as a power amplifier so that tubes 81 and 83 together make up the gate driver (54 in FIGURE 3). The signal then is transmitted via transformer 86 and becomes rectified by the rectifier 87 after which it is applied to charge capacitor 90. The arrangement with capacitor 90 is such that each half cycle of the rectified 800 cycle signal tends to charge the capacitor somewhat higher than the existing voltage which remained across this capacitor after the discharge which took place during the half cycle when the 800 cycle signal is not passing. Thus the capacitor 90 is gradually charged to an increasing potential value until a sufficiently positive voltage is reached, such that the tube 98 of the Schmidt trigger pair of tubes goes conducting and cuts off the other tube 97 at the same time. This action sets the Schmidt trigger, while the voltage charge created by this setting action is not passed on on account of the use of the rectifier 104 in the output circuit of the Schmidt trigger 94. Then at the termination of the 800 cycle control signal the capacitor 90 is rapidly discharged and thus the tube 98 of the Schmidt trigger is cut off. Simultaneously the cross action of the Schmidt trigger causes tube 97 to go conducting once more and to produce a sharp negative pulse at the plate circuit output point in tube 97, which pulse is the trigger pulse output of the Schmidt trigger. This negative trigger pulse is passed on via the capacitor 101 and the circuit connection 102 to the rectifier 104 which has its polarity connected so as to pass this trigger pulse on to become effective at the grid circuit of tube 107 of the first with, that lead to uphole detector 24, e.g. by the circuit connector 25 of FIGURE 1. Like the time break signal circuit, the uphole circuit is connected into the radio 34 via a pair of terminals 47. This circuit is arranged so that the uphole circuit signals will be applied to modulate the radio frequency transmission energy and thus transmit the uphole signals back to the recording station during the same timer operation after the time break signal is similarly sent back.

Referring to FIGURE 3 the operation of the shooting control timer 35 will be described in reference to a block diagram showing. A control signal, which has been already described above, is received over an input circuit 51 (included in connection 36) and goes to a limiter 52 which acts to limit the amplitude of the signal at this point in the circuit for purposes more fully indicated below. The control signal as received over this input circuit 51 is, of course, the demodulated 800 cycle tone. After the signal has passed through limiter 52 it goes to a filter 53 which is a narrow band pass filter having characteristics such that it passes only 800 cycle signals. Then the signal goes from the filter 53 to a gate driver 54 which amplifies the filtered signal and provides sufficient power for applying the signal to the gate portion of a gate and trigger element 55. The signal then acts first to set and then to allow the trigger to be tripped if the signal meets the requirements of the filter and the gate portions of the signal path to this point.

When the trigger is tripped it creates a trigger signal and the trigger signal thus created by trigger 55 acts to trip a first multivibrator 58 that has a time constant of a full second duration. Tripping of multivibrator 58 acts to simultaneously trip a second multivibrator 59 that has a much shorter time constant characteristic and that is employed as a so-called shot delay period in order to provide for time wherein switching transients may be dissipated prior to the shot detonation. It is pointed out that the tripping of multivibrator 58 also acts to control a switch (described below, in re FIGURE 4) for switching the radio 34 of the shooting truck 20 from its receive to its transmit condition. Thus the radio 34 will remain in transmit position for the full one second period during which the multivibrator 58 remains tripped. When the second multivibrator 59 returns back to its stable state, i.e., after its much shorter time delay period, it provides an output trigger signal that trips a third multivibrator 60 which has connected in the output thereof a solenoid 61 (FIGURE 2) which in turn actuates the switch contacts 45 of relay 44 so that the shooting circuit is closed for the time period during which "shoot" multivibrator 60 remains tripped.

The multivibrator 60 is constructed with a short time constant characteristic only long enough to insure operation of the firing cap in the shooting circuit for detonating the charge 22. During this period, of course, the breaking of this shooting circuit which takes place at the instant of the charge detonation will cause the so-called time break signal that will be transmitted back via the radio 34 and antenna 29 to the recording truck 12 as received by its radio employing its antenna 13.

It is to be noted that the sequence of operations carried out within shooting control timer 35 following the tripping of trigger 55, includes first the tripping of the first multivibrator 58, which has a long time constant e.g., 1000 milliseconds, and remains tripped during the remainder of the entire operation. Simultaneously with the tripping of first multivibrator 58 the second multivibrator 59 is also tripped but the time constant thereof is much shorter, e.g., 100 milliseconds or one-tenth the time for the first multivibrator. This second multivibrator merely acts to initiate a predetermined time delay period while the first multivibrator 58 was employed to switch the radio at the shooting truck from receive to transmit. Thus during the full second time period the radio 34 remains in its transmit condition. Now after the short time delay provided by the second multivibrator 59 the third multivibrator 60 will be tripped and thereupon will fire the charge and reopen the charge firing circuit after a predetermined shorter time delay, e.g., 50 milliseconds. During the period for firing of the charge, the time break signal will be transmitted via the radio 34 back to the recording station. Thereafter, e.g., during the remaining 850 milliseconds, the uphole signal data from detector 24 will be received and will, as indicated above, modulate the transmitter so as to send this information back to the recording truck 12. All of this takes place within the thousand millisecond time period after which the first multivibrator 58 will return to its stable state, whereupon the radio 34 is switched back to receive condition and a complete cycle of the shooting operation will be finished.

Referring to FIGURE 4 it is pointed out that this circuit illustrates the details of the shooting control timer 35 which was shown in FIGURE 2 and described in block form in FIGURE 3. In the FIGURE 4 circuit, there is a pair of input terminals 64 where the 800 cycle control signal is received from the radio 34 (FIGURE 2). As indicated above, it is received as a demodulated signal from the radio 34 which is located in the shooting truck 20. This control signal then is carried via a capacitor 65 to one side of a pair of triodes 66 and 67 that are connected as a cathode coupled pair to act as an amplitude limiter for the signal. The output of the limiter is carried via a capacitor 70 and a resistor 71 to reactance elements 72 and 73. These reactance elements together with a pair of rectifiers 76 and 77 that are connected together in opposite polarity between the reactance elements 72 and 73, form the filter 53 described above. The output of the filter thus created by reactance elements 72 and 73 plus the rectifiers 76 and 77, is connected via a resistor 80 to the input of an amplifier tube 81. The signal then continues from amplifier tube 81 via a capacitor 82 to the input of a power amplifier tube 83. The output of the power amplifier 83 (which is part of the gate driver 54 shown in FIGURE 3) is carried via a transformer 86 that has a rectifier 87 connected in series with the secondary or output side thereof as well as a resistor 88 that leads to one side of a capacitor 90. The capacitor 90 has connected thereacross a resistor 91 for determining the time constant of the discharge of the capacitor. It is to be noted that the capacitor 90 and the discharge time constant associated therewith acts as the gate portion of the gate and trigger element 55 (FIGURE 3). Thus the 800 cycle signal is applied via rectifier 87 and through resistor 88 to charge capacitor 90 over a period of time such that a substantial portion of the total duration of the 800 cycle signal is required before the amplitude of the potential of the charge across capacitor 90 is reached which has the level required to set a Schmidt trigger 94 (that will be tripped upon the cessation or termination of the 800 cycle signal).

In other words, it will be observed that the circuit constants for the gate (capacitor 90 et al.) are set up such that the voltage necessary to set the Schmidt trigger 94 will not be reached until the 800 cycle control signal has lasted for about a half second of the total three-quarter second length thereof. Then when the 800 cycle control signal terminates, the discharge time for capacitor 90 is very rapid and thus the Schmidt trigger 94 is tripped, i.e., is allowed to return to its stable state with a triode 97 thereof conducting while triode 98 is cut off. It will be understood that the setting of the Schmidt trigger takes place when the potential on the grid of triode 98 reaches a sufficiently positive value that this tube goes conducting and in consequence cuts off the conduction of triode 97.

As the Schmidt trigger is tripped, the potential change or tripping signal is passed on from the plate circuit of triode 97 via a capacitor 101 and a circuit connection 102 that leads to the input side of a first multivibrator multivibrator 103. This flips the multivibrator 103 by cutting off tube 107 and causing tube 108 to go conductive. The multivibrator 103 holds this state until a predetermined time constant period has elapsed. Simultaneously with the flipping multivibrator 103 to the indicated condition with tube 108 conducting, a second trigger signal is created that is passed on in substantially the same manner as was the first trigger signal from the Schmidt trigger 94. Thus the second trigger signal goes via the capacitor 120 and the rectifier 121 in addition to the capacitor 122 to the grid circuit for tube 123 of the second multivibrator that is the shot delay multivibrator (59 of FIG. 3). Now the time delay period for the second multivibrator 126 is much shorter, e.g. is 100 milliseconds, and consequently after this period of time has elapsed multivibrator 126 returns from its flipped state back to its stable state with the tube 123 conducting once more. This return of the second multivibrator produces a third trigger signal in substantially the same manner as the first and second trigger signals were produced. The third trigger signal then is transmitted on via capacitor 131 and rectifier 132 to the grid circuit of the tube 133 of the third multivibrator 136. This third multivibrator acts to control the closing of the shooting circuit itself, by having the relay 44 in the plate circuit of the normally non-conducting tube 137. Thus following the shot delay time as determined by the second multivibrator 126, the third multivibrator 136 is flipped over and closes the shooting circuit, i.e. contacts 45, and holds them closed for the predetermined short time period as set up by circuit constants in connection with the third multivibrator 136.

Thus it will be observed that the operation of the shooting control timer is such that a control signal is delivered and passed through a gate to trigger a first time period set up by a first multivibrator. This first time period is employed to switch the radio at the shooting location from receive to transmit and hold it in this condition for a predetermined period, e.g. one full second (1000 milliseconds). Simultaneously with the beginning of this one second period a shot delay time is commenced under the control of the second multivibrator 126 and thereafter a shooting circuit is closed and held in the closed state for a different predetermined short time, during which the charge is fired and the time break signal is applied to the transmitter of the radio at the shot point. During the remainder of the full one second time period the signals from the uphole detector are applied to the transmitter at the shot point and thus sent back to the recording station for recording along with the other recorded data. At the end of the one second period the radio at the shot point is returned to receive condition and the shooting operation as controlled from the recording station is terminated. Thus the shooting truck operation now stands in readiness for receipt of further instruction from the recording station.

While a particular embodiment of the invention has been described in considerable detail in accordance with the applicable statutes, this is not to be taken as in any way limiting the invention but merely as being descriptive thereof.

What is claimed as the invention is:

1. In seismic exploration, a radio link controlled shooting sequence timer comprising electronic circuit means for receiving and limiting the amplitude of a control signal having a predetermined monofrequency characteristic and time duration, narrow pass filter means for passing only said predetermined control signal frequency, gate means for setting an electronic trigger upon passage of at least a predetermined time portion of said control signal, said trigger being tripped upon termination of said control signal, first monostable timing means controlled by said trigger when tripped for initiating a first time delay period, additional means controlled by said first timing means for closing a circuit to switch on a transmitter prior to shooting, second monostable timing means controlled by said first monostable timing means and actuated simultaneously therewith to initiate a second time delay period, said second time delay period being less than said first time delay period, means controlled by said second timing means at the end of said second time delay period for actuating a shooting circuit to detonate a seismic charge.

2. In seismic exploration radio controlled shooting wherein there is employed a recording truck and a shooting truck, said recording and shooting trucks having receiving and transmitting radios in each, a source of control signal in said recording truck, and a shooting control timer in said shooting truck, said timer comprising a gate and trigger for receiving said control signal, said trigger providing an output signal after termination of said control signal, a first multivibrator connected to receive said trigger output signal, a second multivibrator connected for actuation simultaneously with said first multivibrator, and a third multivibrator actuated by said second multivibrator and having an output circuit for firing a seismic charge, said first multivibrator having an output circuit for switching said shooting truck radio from receive to transmit condition.

3. In seismic exploration radio controlled shooting wherein there is employed a recording truck and a shooting truck, said recording and shooting trucks having receiving and transmitting radios in each, a source of monofrequency control signal in said recording truck having a predetermined time duration, and a shooting control timer in said shooting truck, said timer comprising a narrow band pass filter for passing only said control signal, a gate and trigger for receiving said control signal, said trigger providing an output signal after termination of said control signal, a first multivibrator connected to receive said trigger output signal, a second multivibrator connected for actuation simultaneously with said first multivibrator, and a third multivibrator actuated by said second multivibrator and having an output circuit for firing a seismic charge, said first multivibrator having an output circuit for switching said shooting truck radio from receive to transmit condition.

4. In seismic exploration radio controlled shooting wherein there is employed a recording truck and a shooting truck, said recording and shooting trucks having receiving and transmitting radios in each, a source of monofrequency control signal in said recording truck having a predetermined time duration, and a shooting control timer in said shooting truck, said timer comprising a narrow band pass filter for passing only said control signal, a gate including a capacitor and charging circuit therefor providing a timing input to a trigger, said input time being less than said control signal time duration but long enough to eliminate unwanted signals, said trigger being set only after the termination of said charging input time, said trigger providing an output signal after termination of said control signal, a first monostable multivibrator connected to receive said trigger output signal, a second monostable multivibrator connected for actuation simultaneously with said first multivibrator, and a third monostable multivibrator actuated by said second multivibrator and having an output circuit for firing a seismic charge, said first multivibrator having an output circuit for switching said shooting truck radio from receive to transmit condition, said first multivibrator having a time period of predetermined length sufficient to encompass the shooting operation, and said second multivibrator having a time period sufficient to dissipate switching transients.

5. A radio communication system for use in seismic exploration operations wherein radio communication is maintained between a recording station and a shooting station, said shooting station having a charge firing circuit and a seismic detector uphole circuit, the combination comprising a source of constant frequency control signal at said recording station having a predetermined time duration, and a shooting control timer at said shooting station for actuating said shooting circuit and connecting said uphole circuit to the transmitter at said shooting station, said shooting control timer comprising a gate for passing said control signal after a predetermined time portion thereof, a trigger circuit connected to said gate to be set by said control signal and for producing a trigger signal at the termination of said control signal, a first multivibrator connected to receive said trigger signal and having a predetermined time delay period, said first multivibrator having an output circuit for switching the radio at said shooting station from receive to transmit and having another output circuit for producing a second trigger signal, a second multivibrator connected to receive said second trigger signal and having a predetermined time delay period less than the delay period for said first multivibrator, said second multivibrator having an output circuit for providing a third trigger signal at the end of the said second time delay period, and means for closing said shooting circuit to fire said charge upon receipt of said third trigger signal.

6. The invention according to claim 5 wherein said multivibrators are monostable to eliminate the need for resetting thereof.

References Cited by the Examiner
UNITED STATES PATENTS

| | | | |
|---|---|---|---|
| 2,156,624 | 5/1939 | Faust | 181—.5 |
| 2,374,779 | 5/1945 | Preston | 328—75 |
| 2,413,296 | 12/1946 | Deal et al. | 102—70.2 |
| 2,700,753 | 1/1955 | Peterson | 181—.5 |
| 2,856,852 | 10/1958 | Hinman et al. | 102—70.2 |
| 2,938,168 | 5/1960 | Kreuder | 328—55 |
| 3,014,215 | 12/1961 | Macdonald | 102—70.2 |
| 3,062,315 | 11/1962 | Herzog | 181—.5 |
| 3,098,212 | 7/1963 | Creamer | 340—15 |
| 3,125,026 | 3/1964 | Johnson | 102—70.2 |

SAMUEL FEINBERG, *Primary Examiner.*

ALDRICH F. MEDBERG, *Examiner.*